United States Patent
Yamaguchi et al.

(10) Patent No.: US 7,800,274 B2
(45) Date of Patent: Sep. 21, 2010

(54) THIN STATOR, ECCENTRIC MOTOR AND AXIAL AIR-GAP BRUSHLESS VIBRATION MOTOR EQUIPPED WITH THE SAME

(75) Inventors: Tadao Yamaguchi, Isesaki (JP); Katsuhito Sohara, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 645 days.

(21) Appl. No.: 11/642,353

(22) Filed: Dec. 20, 2006

(65) Prior Publication Data
US 2008/0018187 A1    Jan. 24, 2008

(30) Foreign Application Priority Data

| Jul. 20, 2006 | (JP) | ............................. | 2006-197615 |
| Aug. 23, 2006 | (JP) | ............................. | 2006-226897 |
| Sep. 20, 2006 | (JP) | ............................. | 2006-253886 |

(51) Int. Cl.
H02K 21/12    (2006.01)
H02K 7/065    (2006.01)

(52) U.S. Cl. .................... 310/254.1; 310/81; 310/90.5; 310/DIG. 6

(58) Field of Classification Search ................... 310/81, 310/254.1, DIG. 6
See application file for complete search history.

(56) References Cited

U.S. PATENT DOCUMENTS 6,762,518 B1 * 7/2004 Yamaguchi et al. ....... 310/67 R
6,836,039 B2 * 12/2004 Choi et al. .................... 310/81
2004/0084980 A1 * 5/2004 Yamaguchi et al. .......... 310/81
2006/0022537 A1 * 2/2006 Yamaguchi et al. .......... 310/81
2006/0028077 A1 * 2/2006 Yamaguchi et al. .......... 310/81
2006/0091747 A1 * 5/2006 Yamaguchi et al. .......... 310/81

FOREIGN PATENT DOCUMENTS

| JP | 4-137463 | 12/1992 |
| JP | 9-162503 | 6/1997 |
| JP | 2000-245103 | 9/2000 |
| JP | 2002-142427 | 5/2002 |

(Continued)

OTHER PUBLICATIONS

Machine Translation JPO Website, Yamaguchi et al., JP 2004-297903, Oct. 2004 http://www4.ipdl.inpit.go.jp/Tokujitu/PAJdetail.ipdl?N0000=60&N0120=01&N2001=2&N3001=2004-297903.*

(Continued)

Primary Examiner—Burton Mullins
(74) Attorney, Agent, or Firm—Jordan and Hamburg LLP (57) ABSTRACT

A stator includes a bracket having a shaft bearing portion at a center, a stator base including a flexible printed wiring board outwardly attached to the shaft bearing portion, single-phase air-armature coils disposed on the stator base, and a drive circuit member disposed on the stator base so as not to overlap with the single-phase air-core armature coils. The bracket has a through hole at the section corresponding to the bottom of the drive circuit member. The stator base is embedded at least partly in the thickness direction in the through hole and fixed using a resin, and a detent torque generation member is contained in, and is no thicker than, the stator base.

5 Claims, 8 Drawing Sheets

FOREIGN PATENT DOCUMENTS

| JP | 2002-143767 | | 5/2002 |
|---|---|---|---|
| JP | 2004-297903 | * | 10/2004 |
| JP | 2005-27484 | * | 1/2005 |
| JP | 2005-051945 | | 2/2005 |
| JP | 2005-117739 | * | 4/2005 |

OTHER PUBLICATIONS

Machine Translation JPO Website, Yamaguchi et al., JP 2005-117739, Apr. 2005 http://www4.ipdl.inpit.go.jp/Tokujitu/PAJdetail.ipdl?N0000=60&N0120=01&N2001=2&N3001=2005-117739.*

* cited by examiner

THIN STATOR, ECCENTRIC MOTOR AND AXIAL AIR-GAP BRUSHLESS VIBRATION MOTOR EQUIPPED WITH THE SAME

BACKGROUND OF THE INVENTION

The present invention relates to a thin stator suitable for use as silent call means for a portable communication device and the like, an eccentric rotor, and an axial air-gap brushless vibration motor equipped with the same.

Flat axial air-gap brushless vibration motors have been previously proposed, for example, in Laid-open Japanese Utility Model Application No. H4-137463 and Laid-open Japanese Patent Application No. 2002-143767, and include a motor of a coreless slotless type comprising a bearing.

Known brushless vibration motors, for example, as disclosed in Laid-open Japanese Patent Application No. 2000-245103, are equipped with a drive circuit, and include a noncircular motor of a cored type comprising a plurality of equidistantly disposed salient poles and an armature coil wound therearound, and a drive circuit member disposed in a stator.

However, a motor according to such design tends to be long in the lateral direction, decreasing mounting efficiency in the case of a printed wiring board in the SMD style. Further, because it is a cored type, such motor invariably becomes thick and thus serves no practical purpose.

Another proposed motor, disclosed for example in Laid-open Japanese Patent Application No. 2002-142427, includes both cored and slotless coreless types, wherein some of a plurality of armature coils are removed to create a dead space, and a drive circuit member is disposed in the dead space.

A single phase motor driven by a single Hall sensor requires a magnetic detent torque generation member for making the rotor magnet stop at a specific position so as to ensure the subsequent start.

In order to obtain the desired detent torque generation force, the detent torque generation member requires a certain thickness, with a detent torque generation member disposed on a bracket. Consequently, it is difficult to find space for disposition, and the configuration operates against the goal of forming a thinner motor.

Further, when the detent torque generation member is formed by printing, for example, to obtain the desired detent torque generation force, the detent torque generation member again needs to have a certain thickness and width. But increasing width makes the position of a detent torque generation member unstable, and decreasing width, on the other hand, will result in a substantial sacrifice of thickness.

Meanwhile, there is another proposed motor wherein detent torque parts of a detent torque generation member are accommodated within the inner diameter of an air-core armature coil so as to axially protrude therefrom, enabling the thickness of the detent torque generation member to be substantially ignored. However, such motor is problematic in that its coil inner diameter is limited, restricting the number of windings on a coil. More specifically, the disposition position of a detent torque part needs to be intentionally displaced from the coil center, so that the detent torque part stops at a magnetic pole center or neutral position in order to avoid start-up error. With a coil having a small inner diameter, such displacement angle cannot be made large. Unless a certain displacement angle can be maintained, the number of effective conductors that contribute to torque and the position thereof are sacrificed, leading to reduction of starting torque.

In addition, there has been demand for a long life, extremely thin brushless vibration motor for use as silent call means in accordance with the recent trend of thinner portable devices. However, when thickness is to be less than 2 mm, rotor thickness and drive circuit member thickness are a problem, with the natural result being that the thickness of the rotor is sacrificed, making it difficult to secure adequate vibration.

Further, with a small brushless vibration motor, in order to shift the center of gravity of the rotor itself in the radial direction so as to generate centrifugal vibrations, a sintered tungsten alloy eccentric weight must be attached.

It is conceivable to use adhesion, spot welding by laser or other means for fixing such eccentric weight to a magnetic iron alloy rotor yoke. However, adhesion is not sufficient to achieve reliable impact resistance. Also, because tungsten has a higher melting point than a metal to be welded thereto, when welding by laser, it is difficult to weld tungsten to, for example, the above magnetic iron alloy.

Thus, an object of the present invention is to provide a very thin stator configured so that even when a drive circuit member is thicker than armature coils, the rotor is not sacrificed to accommodate the thickness of the drive circuit member, as well as an axial air-gap brushless vibration motor equipped with such stator.

A further object of the present invention is to provide a very thin stator configured so that the disposition thickness of detent torque parts of a detent torque generation member can be completely ignored, and regardless of coil inner diameter, a prescribed optimal detent torque generation member position (displacement angle) can be obtained, as well as an axial air-gap brushless vibration motor equipped with such stator.

A still further object of the present invention is to provide an eccentric rotor to be combined with the above very thin stator with strong attachment with the eccentric weight, as well as an axial air-gap brushless vibration motor equipped therewith.

SUMMARY OF THE INVENTION

The above problems can be resolved by a thin stator comprising a bracket including a shaft bearing portion at the center thereof, a stator base outward thereof comprising a flexible printed wiring board attached to the bracket, air-armature coils disposed on the stator base, and a drive circuit member disposed on the stator base so as not to overlap with the air-core armature coils, wherein the bracket has a recess at the section corresponding to the bottom of the drive circuit member to be disposed, and the stator base is embedded in the recess at least partly in the thickness direction.

With such a constitution, at least the portion of a stator base in which a drive circuit member is disposed is embedded in the bracket, thereby obtaining an extremely thin stator, even when the drive circuit member is thicker than the air-core armature coils.

More specifically, in a preferred configuration, the recess is a through hole, and the stator base has notches near the section in which the drive circuit member is disposed. In another preferred configuration, the drive circuit member is fixed on the stator base using a resin so that the height of the upper surface thereof is restricted.

With such a constitution, because notches facilitate deformation of a stator base, the drive member assumes a low profile in the bracket recess with no stress.

In another specific constitution that contributes to minimization, the air-core armature coils are of a single-phase, the stator base has a central through hole in which the shaft bearing part is accommodated and at least one long hole provided radially outward of the central through hole, and at least one magnetic detent torque part is accommodated in the long hole so as not to protrude from the stator base upper surface.

With such a constitution, since the detent torque part is included within the stator base, its thickness can be substantially ignored, and a detent torque part can be set at a position without regard to the inner diameter of the air-core armature coil inner. For this reason, the air-core armature coil inner diameter can be made small, enabling a sufficient of number of windings to be secured and sufficient starting torque to be achieved and preventing members constituting the stator from overlapping with one another. As a result, the stator can be very thin.

In a preferred embodiment, the bracket has nonmagnetic or weak magnetic properties, the central through hole and long hole in the stator base are formed so as to be connected to each other, and the detent torque part accommodated in the long hole is formed integrally with the detent torque generation member disposed in the central through hole.

With such a constitution, the influence of bracket magnetic force can be suppressed, enabling the magnetism of the detent torque generation member to be reduced.

In another preferred embodiment, the bracket is formed of a magnetic metal sheet, and the detent torque part is integral with, and protrudes from, the bracket. In a preferred constitution, magnetic attraction a force buffer is formed adjacent to the bracket detent torque part.

With such a constitution, no additional detent torque generation member is necessary, enabling reduction in the number of members used for a thin stator.

Meanwhile, a rotor that contributes to minimization preferably comprises a metal rotor case comprising a shaft bearing part at the center, a magnet outward thereof fixed to the metal rotor case, and a tungsten eccentric weight outward thereof fixed to the rotor case, wherein the rotor case is joined with the eccentric weight by lead free solder containing tin as a main component. In a preferred constitution thereof the tungsten eccentric weight contains nickel, copper or iron as an alloy component.

With such a constitution, because a tungsten eccentric weight can be easily soldered on the surface, spot welding, adhesion and the like are sufficiently reliable. Therefore, a thin rotor with sufficient impact resistance and high reliability can be achieved.

In a preferred embodiment of specific constitution of the eccentric rotor, the eccentric weight is configured so that a main component formed in an arc shape and a bank hanging on the outer periphery of the main component are provided. Toward the metal rotor case lateral periphery, a recess is formed in the space between the weight and the metal rotor case, and the weight may be joined by soldering so that the soldered surface does not outwardly protrude from the axial surface.

With such a constitution, with a bank using dead space on the stator side, radial movement of the center of gravity can be secured without sacrificing thickness.

In another embodiment having specific constitution of the eccentric rotor, the eccentric weight is configured so as to have a main component in an arc shape, and between the weight and the metal rotor case there is a recess allowing a portion of the magnet to be visible, and the eccentric weight is joined to the magnet and metal rotor case by soldering at least in the recess.

With such a constitution, the eccentric weight can be firmly fixed in an integral manner.

To use such a thin stator and eccentric rotor to achieve an axial air-gap brushless motor, a thin stator and the eccentric rotor combined therewith across an axial air-gap are provided, and an outer case is assembled with the thin stator so as to cover the eccentric rotor.

With such a constitution, a very thin motor with a thickness of, for example, 2 mm or less, can be achieved.

In yet another embodiment of specific constitution, in the outer case, at least a ceiling is nonmagnetic or weakly magnetic, a magnetic body is provided on the lateral periphery, and the lower part of the magnetic body circumferentially extends so as to serve as a flange and attaches to the thin stator bracket.

With such a constitution, such an axial air-gap brushless motor can be configured as the central magnetic pole of an electro-accoustic converter.

DETAILED DESCRIPTION OF THE PREFERRED EMBODIMENT

First Embodiment

Figure 1:
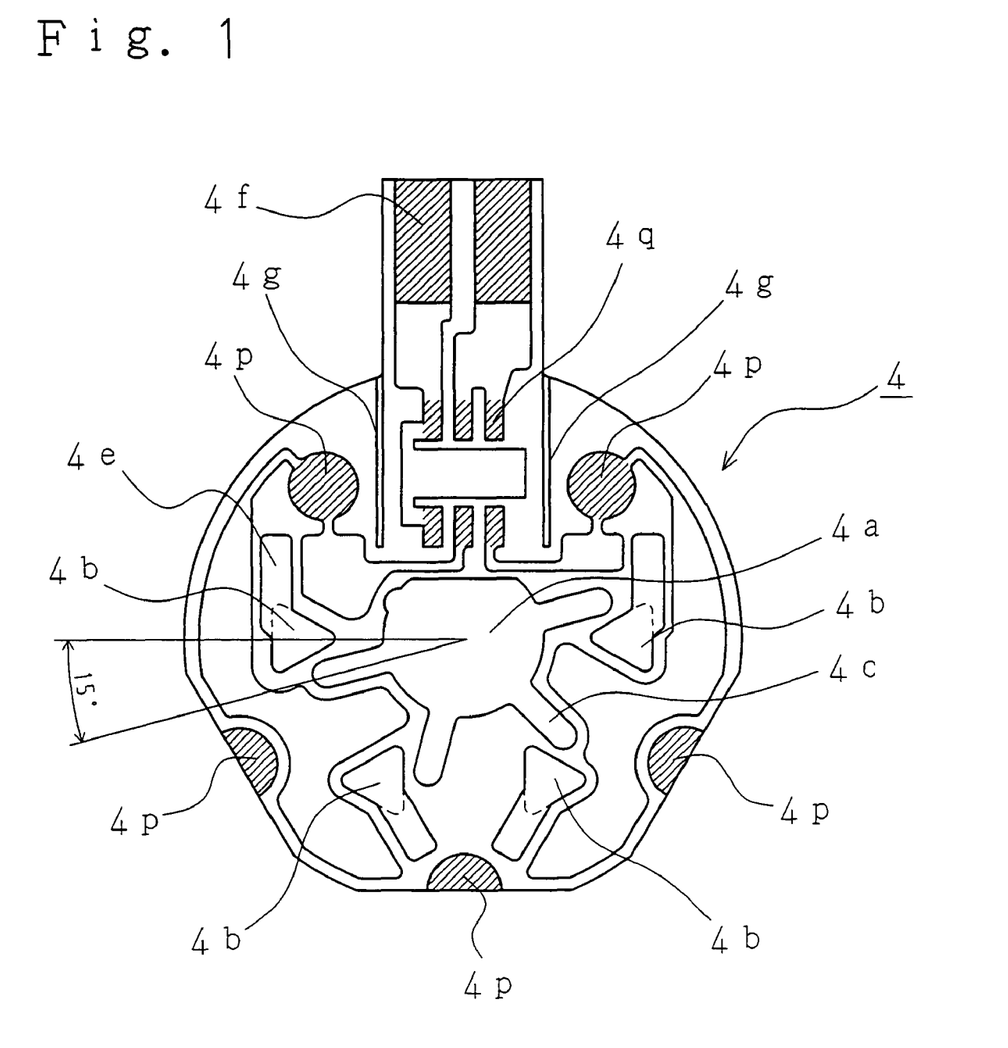
FIG. 1 is a plan view of a stator base that is a main component constituting a stator of the present invention.
Figure 2:
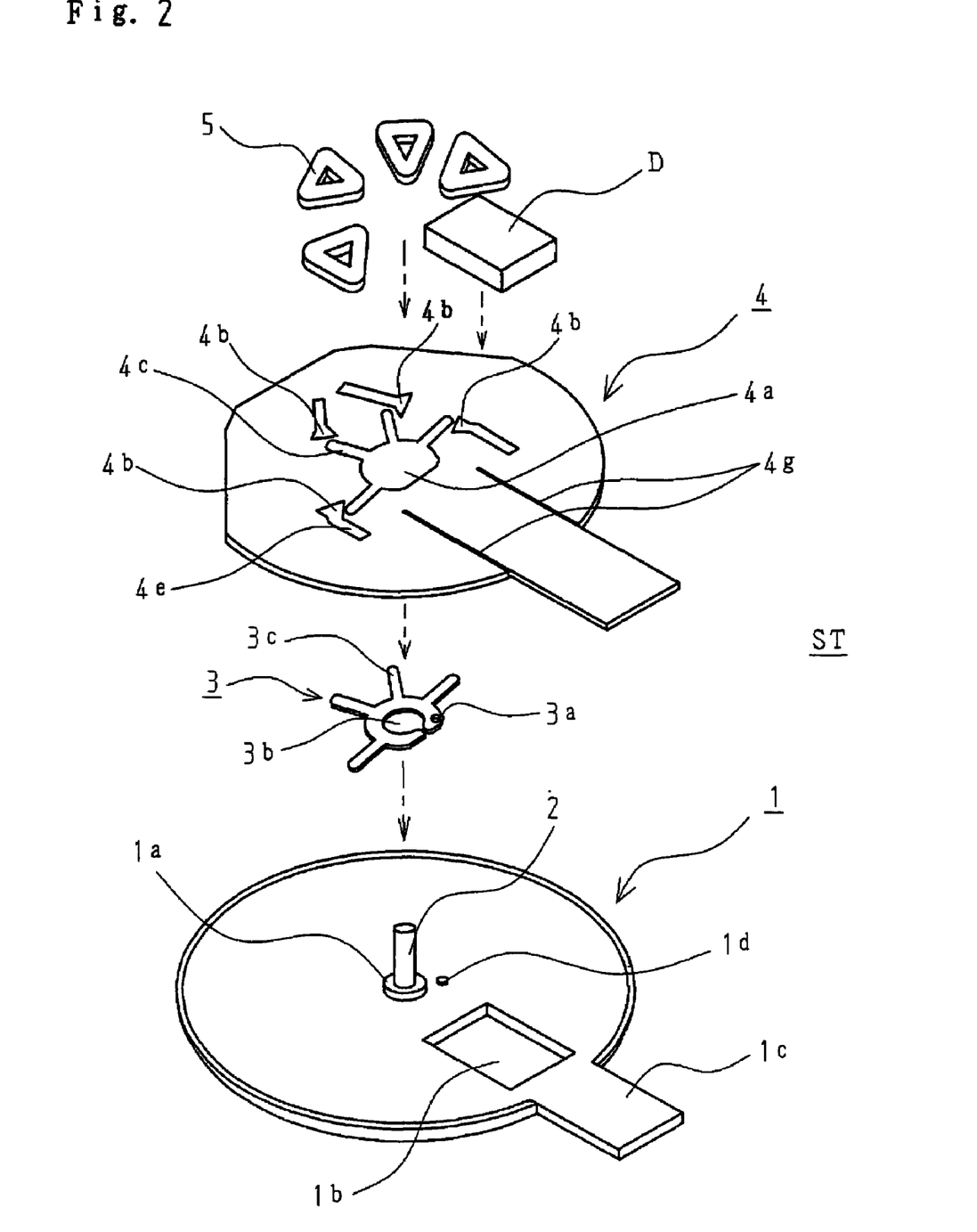
FIG. 2 is an assembly diagram of a stator equipped with the stator base of FIG. 1.

FIGS. 1-2 shows, as a component constituting a stator ST of the present invention, a thin bracket 1 formed of a nonmagnetic or weak magnetic sheet with a thickness of about 0.15 mm, and comprising a shallow burring 1a pressed so as to penetrate therethrough and stand at the center thereof. A shaft 2 is fitted into the shallow burring 1a and fixed thereto by application from the outside of laser, thus forming a shaft bearing portion.

The bracket 1 further has a rectangular through hole 1b as a recess, and a power feed terminal installation part 1c extending laterally therefrom.

The bracket 1 has, on the upper surface thereof, a detent torque generation member 3 formed of a magnetic stainless sheet with a thickness of about 0.1 mm, which is disposed on the burring 1a by the mating of a positioning hole 3a with a protrusion 1d on the bracket 1 concurrently with the fitting of a central through hole 3b on the burring 1a.

The detent torque generation member 3 further comprises detent torque parts 3c formed in the radial direction from the through hole 3a at the same pitch as long holes 4c formed in a stator base (described below).

A stator base 4, to which the detent torque generation member 3 is to be combined, comprises a flexible substrate with a thickness of about 0.15 mm, such thickness including a printed wiring land, provided with a central through hole 4a to match the exterior shape of the center of the detent torque generation member 3, radially outward thereof four guide holes 4*b* for attaching air-core armature coils formed at a pitch of 60°, and four long holes 4*c* connected to the central through hole 4*a* and formed in the radially outward direction at a disposition opening angle of 60°, forming an air-core armature coil connection pattern 4*p* and connection pattern 4*q* for a drive circuit member D.

The long holes 4*c* are provided at positions at disposition opening angles of roughly 15° from the center of the armature coil attachment guide holes 4*b* that will be the centers of the disposed air-core armature coils. To ensure that the thin stator base 4 remains strong, the long holes are provided spaced apart from one another so as not to connect to the armature coil attachment guide holes 4*b*, and escape grooves 4*e* for leading out air-core armature coil terminal winding ends (described later) are provided connected to the armature coil attachment guide holes 4*b*. Extending laterally outward from the stator base 4 is a power feed terminal 4*f* at the position of the power feed terminal installation part. As a matter of course, the land patterns are subject to resist treatment with the exception of the solder connection parts shaded in the drawing.

The disposition opening angle for detent torque parts 3*c* is set at 15° from the coil center, and when the angle between magnetic poles of axial air-gap magnet of a rotor to be combined therewith is 60°, the detent torque parts are set at positions such that the magnet can stop at either at a magnetic pole peak or neutral zone.

The stator base 4 is configured so that four air-core armature coils 5, each wound around a winding shaft roughly equal in size to the air-core armature coil attachment guide holes 4*b* and having a thickness of about 0.35 mm, are fixed by a UV curable anaerobic adhesive at the position of the air-core armature coil attachment guide holes 4*b* using a jig or the like, and the terminals thereof are soldered and connected to the prescribed wiring pattern 4*p* so as to be in a single phase.

In the foregoing configuration there are four air-core armature coils for the purpose of miniaturization. Alternatively, as long as wires are connected in a single phase, a two air-core armature coil configuration may be used if thickness allows.

In FIG. 2, to avoid an overly complex image, an air-core armature coil terminal, connection land patterns and the like are omitted.

Here, the armature coil attachment guide holes 4*b* do not necessarily have to be provided if the air-core armature coils 5 are attached by fitting the coils to a jig and applying adhesive prior to covering with the stator base 4.

The drive circuit member D, comprising a Hall sensor with a thickness of roughly 0.5 mm that drives air-core armature coils 5, is soldered so as not to overlap with the air-core armature coils 5 when viewed from a plan view, and at a position where a suitable electrical neutrality can be obtained. Here, the incorporated Hall sensor is positioned in accordance with the magnetic poles of the magnet with which it is to be combined, and with a magnet such as this comprising six magnetic poles, is disposed at any one of the positions of 90°, 150°, and 210° from the center of the air-core armature coil.

The stator base 4 has notches 4*g* along both sides of the disposed drive circuit member D at the position of the rectangular hole 1*b* in the bracket 1, facilitating the bending and embedding of the stator base 4 into the through hole 1*b* at the position of the drive circuit member D.

The stator base 4 thus configured is attached to the bracket 1 via the UV curable anaerobic adhesive. At this time, the detent torque parts 3*c* are fitted in the long holes 4*c*, and the central through hole 4*a* can accommodate the exterior shape of the central part of the detent torque generation member 3. Therefore, at least the detent torque generation member 3 with a thickness of about 0.1 mm can be fully contained in the thickness direction within the stator base 4 having a thickness of about 0.15 mm. As a result, no regard has to be given to the thickness thereof. More specifically, an optimal position can be set so that sufficient starting torque can be obtained without unreasonably causing the detent torque generation member to be contained within the air core armature coils.

Here, to prevent a UV curable anaerobic adhesive from flowing out from the rectangular hole 1*b*, the bottom of the bracket 1 can be sealed, the height of the drive circuit member D is adjusted using a transparent jig permeable to ultraviolet rays, and ultraviolet rays are applied to fix the same.

In place of the UV curable anaerobic adhesive, the drive circuit member D can be integrally fixed, including the air core armature coil 5, with a synthetic resin.

Second Embodiment

Figure 3:
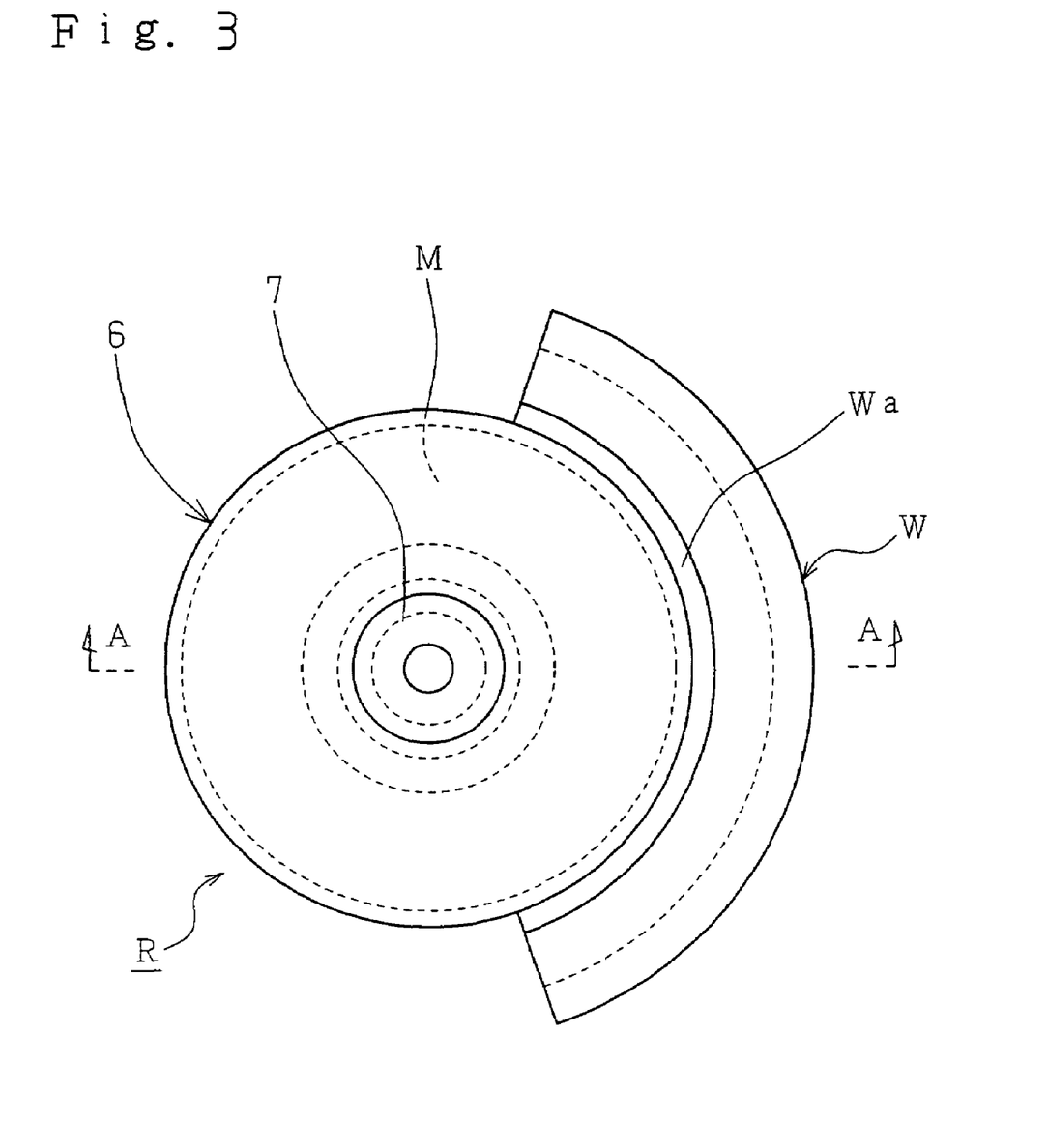
FIG. 3 is a plan view of an eccentric rotor combined with the stator of FIG. 1.

An eccentric rotor R facing the stator ST across an axial air gap is configured as shown in FIG. 3. Eccentric rotor R comprises an axial air-gap magnet M, an eccentric weight W having an arc-shaped main component disposed partly around the magnet M, a magnetic metal rotor case 6 with a thickness of 0.15 mm to which the foregoing are fixed, and a flange type bearing 7 fixed at the center of rotation of the rotor case 6 by welding or the like.

Figure 4:
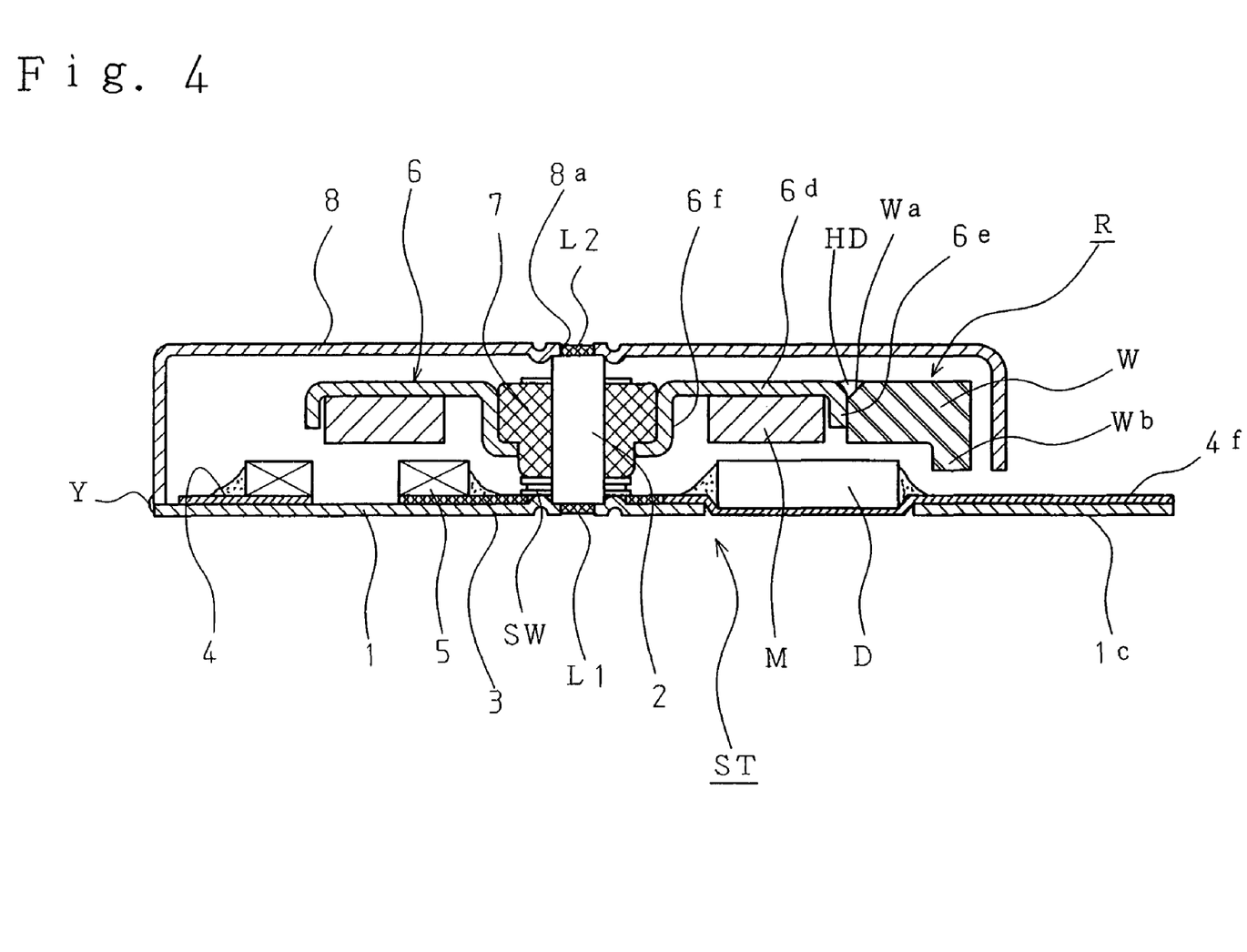
FIG. 4 is a vertical cross-sectional view of an axial air-gap brushless vibration motor equipped with the stator of FIG. 2 and eccentric rotor of FIG. 3.

FIG. 4 shows a fixed shaft type axial air-gap brushless vibration motor of a coreless slotless type comprising such stator ST and eccentric rotor R. Except for certain parts, explanations have already been given for the constitution of the stator, and are here omitted.

The rotor case 6 of the eccentric rotor R comprises a flat part 6*d* to which the upper surface of the magnet M is adhered, an outer diameter hanging portion 6*e* continuing therefrom, and a hanging portion on the inner diameter side 6*f* that supports the bearing 7.

The eccentric weight W employed herein contains a small amount of nickel as an alloy component other than tungsten, and copper or iron is bound thereto. For this reason, even with difficult-to-melt tungsten, soldering is easy.

The eccentric weight W comprises a bank Wb hanging in the peripheral axial direction, and which is fixed outward of the magnet M. Fixing of the eccentric weight W can be conveniently achieved by largely chamfering an arc-shaped weight inner diameter part Wa at the shoulder of the rotor case outer diameter hanging portion 6*e* to form a recess, and soldering therein, using a lead free solder HD, to join the weight and the rotor case. To secure greater strength, the rotor case outer diameter hanging portion 6*e* can optionally be soldered at a lower portion thereof in the same manner. Here, as the lead free solder HD, a tin composition containing 3% silver and 0.5% copper (e.g. Ecosolder M705 by Senju Kinzoku) is, for example, used, and stick solder or solder paste is fitted into the recess and soldered, using a soldering iron, hot air, reflow, laser, or other heat source.

No particular limitations are placed on a composition of the solder material, provided it is lead free and contains tin as a main component.

Such a constitution ensures peeling strength, which cannot be expected from welding, and the soldering together of surfaces, which is difficult with spot welding using laser because tungsten is difficult to melt, becomes easy, while reliability is maintained.

Further, because the rotor case 6 is joined with the eccentric weight W without attachment using a large protrusion and recess, there is no sacrifice of eccentric weight mass.

The eccentric rotor R thus configured is rotatably fitted to the shaft 2 via a thrust washer SW, and accommodated in an outer case 8. An opening of the outer case 8 is attached to the outer periphery of the bracket 1 in the stator by laser spot welding Y.

Here, to increase strength, the distal end of the shaft 2 is laser welded L2 to a shallow burring-shaped central hole 8a in the outer case 8.

Third Embodiment

Figure 5:
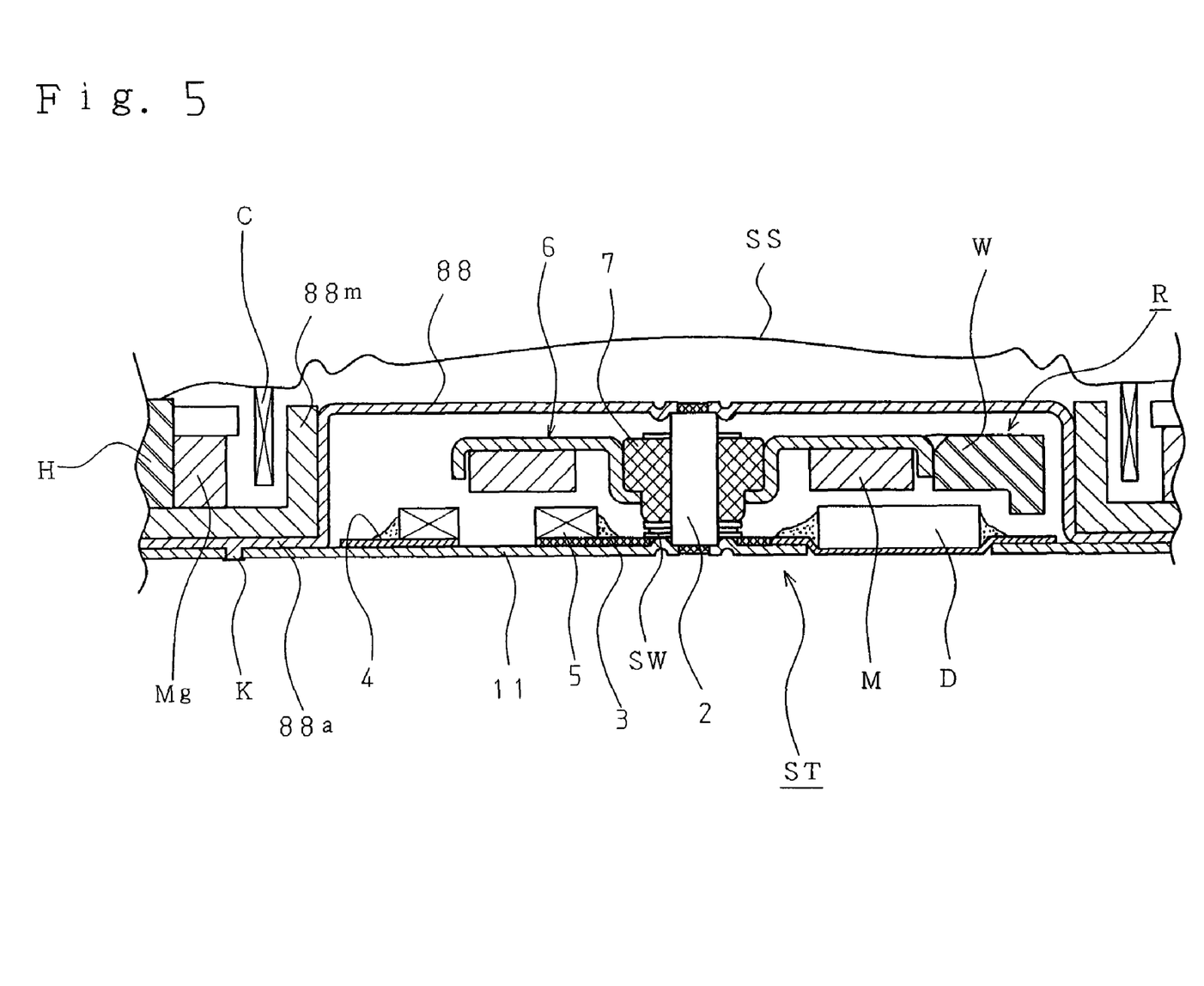
FIG. 5 is a vertical cross-sectional view of another example employing such motor.

FIG. 5 shows a variation of FIG. 4, and is an embodiment suitable for cases where such an axial air-gap motor is used as a central magnetic pole for an electromagnetic acoustic converter.

The difference from FIG. 4 is as follows. A lower part of an outer case 88 circumferentially extends so as to serve as a flange 88a, and connects with the stator bracket 11 with a protrusion and recess joint K, and a magnetic body 88m is disposed around the outer case 88. In the drawing, Mg is speaker-side excitation magnet, C is an excitation coil, SS is a vibration thin plate, and H is a speaker housing.

Here, the outer case 88 is configured such that at least a ceiling is nonmagnetic so as to prevent leaked magnetic flux from the speaker-side excitation magnet Mg from affecting the rotor magnet M, and the magnetic flux of the excitation magnet Mg is stopped by the magnetic body 88m.

If radial direction size poses a problem when separately disposing the magnetic body 88m, the outer case 88 may be configured so as to have a nonmagnetic disk shape member as a ceiling and have a magnetic body positioned on the lateral circumference.

Here, the detent torque parts in the stator are separated from the magnetic body of the outer case 88, and are not influenced by the speaker-side excitation magnet Mg.

With such a constitution, a very thin electromagnetic acoustic converter can be achieved.

Fourth Embodiment

Figure 6:
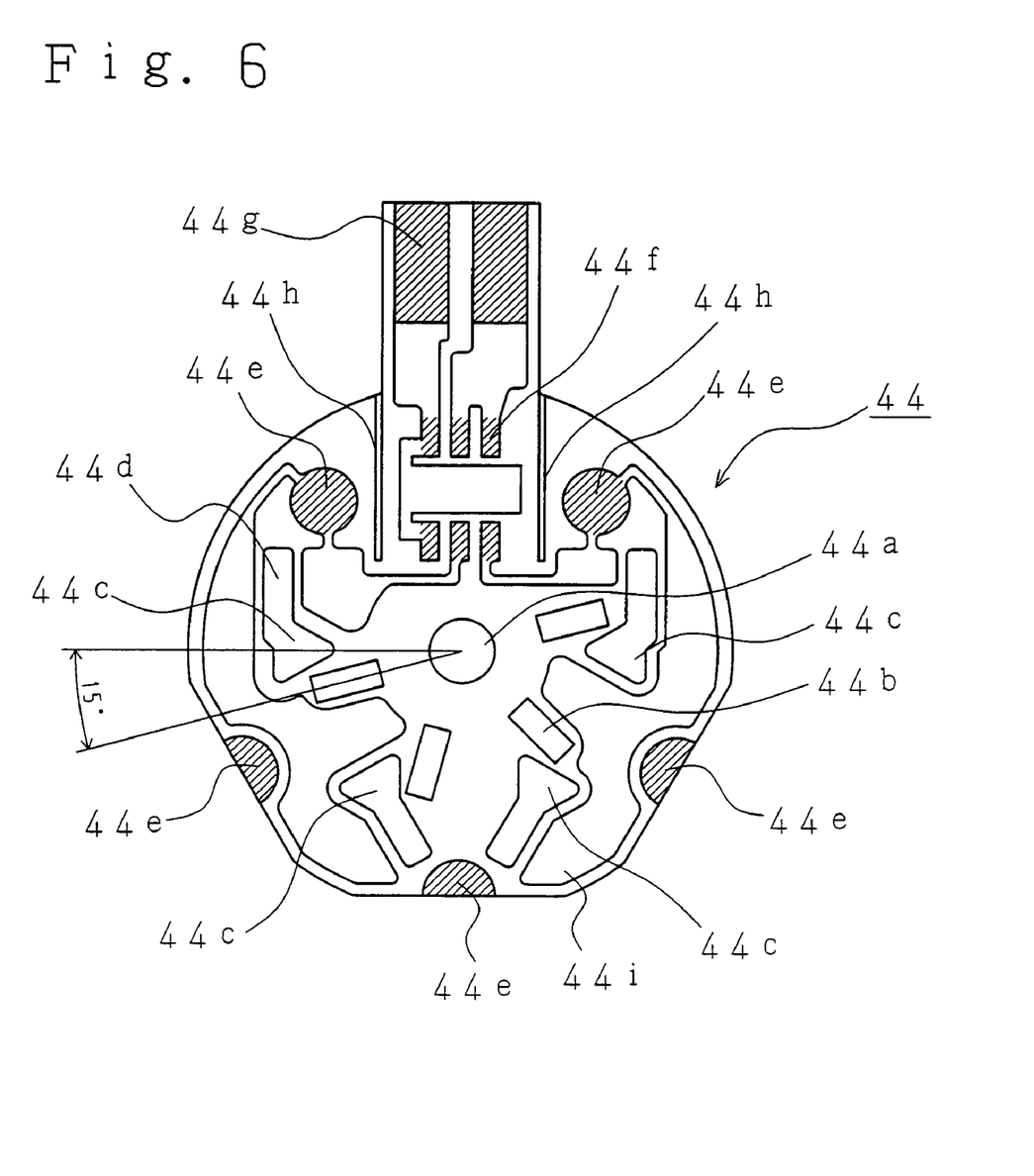
FIG. 6 is a plan view of a variation of the stator base of FIG. 1.

Explanations will be given for a variation of the stator in FIG. 2 with reference to FIGS. 6-7.

A thin bracket 111 constituting a stator ST1 is formed of a magnetic stainless sheet (e.g. SUS 430 series) with a thickness of about 0.2 mm, and comprises a shaft bearing part 111a pressed to form a burring shape at the center thereof, and a shaft 2 is pressed inserted therein. Radially outward thereof, four long protrusions 111b at a pitch of 60° are pressed upward from the back surface so as to stand. The protrusions 111b have a height no thicker than the stator base 44 (described below), achieving the function of generating detent torque. The bracket 111 further has a rectangular hole 111c at the position of a drive circuit member (described below) to be disposed, and a laterally extending power feed terminal installation part 111d.

Here, to achieve more effective detent torque generation, it is preferable to provide magnetic attraction force buffer structure 111e formed of a plurality of small holes, recesses or the like adjacent to the protrusions 111b.

A stator base 44 attached to the bracket 111 comprises a flexible substrate with a thickness of about 0.1 mm, having a central through hole 44a to be fitted on the shaft bearing portion 11a, and outward thereof, four long holes 44b at positions corresponding to the protrusions 111b formed at a pitch of 60°.

Outward of the central hole 44a there are provided armature coil attachment guide holes 44c formed at a pitch of 60°, and consecutive therewith escape grooves 44d for leading out air-core armature coil winding end terminals. To compensate for the shortfall in strength due to these holes, a discard pattern 44i, coil connection pattern 44e, and drive circuit connection pattern 44f are formed.

Here, the long holes 44b are provided at positions with a disposition opening angle of roughly 15° from the center of the armature coil attachment guide holes 44c that will be the center of the air-core armature coils to be disposed thereupon.

Further, a power feed terminal 44g extends laterally at the power feed terminal installation part 111d position.

As a matter of course, each pattern is subject to resist treatment with the exception of the connection parts shading in the drawing, and notches 44h are formed next to the drive circuit connection pattern 44f so as to facilitate bending.

A disposition opening angle of 15°, when the angle between poles of an axial air-gap magnet magnetic pole of the corresponding rotor is 60°, will be a position causing the magnet to stop at a magnetic pole peak or neutral position.

As a matter of course, if the opening angle between magnetic poles of the rotor axial air-gap magnet is 90°, a preferable setting is 22.5°.

Figure 7:
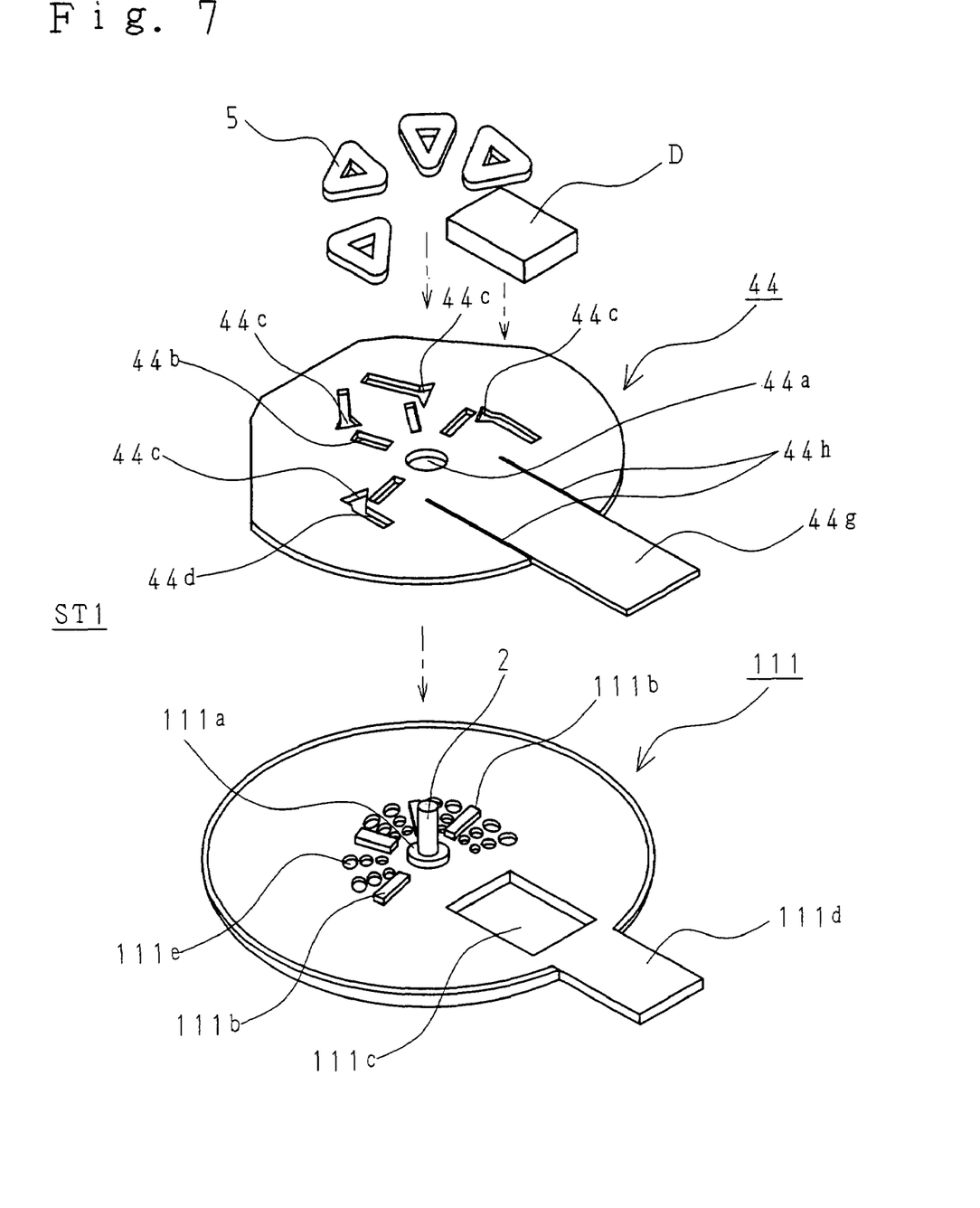
FIG. 7 is an assembly diagram of a stator equipped with the stator base of FIG. 6 and showing a variation of FIG. 2.

The stator base 44 is configured so that, as shown in FIG. 7, four air-core armature coils 5 each wound around a winding shaft roughly equal in size to the armature coil attachment guide holes 44c are fixed to the positions of the armature coil attachment guide holes 44c using a jig or the like and a UV curable anaerobic adhesive, and terminals thereof are soldered and connected to the given coil connection pattern 44e so as to be in a single phase.

As long as wires are connected in the single phase, the motor may comprise two air-core armature coils, if thickness allows.

In FIG. 7, to avoid complexity, air-core armature coil terminals, connection land patterns and the like are omitted.

Here, it is noted that the armature coil attachment guide holes 44c do not necessarily have to be provided if the air-core armature coils 5 are attached by fitting the coils to a jig and adhesive is applied thereto, and thereafter the stator base 44 is set down upon the bracket.

The air-core armature coils 5 are soldered and connected so that the drive circuit member D incorporating a Hall sensor for driving the air-core armature coils 5 does not overlap with the air-core armature coils 5 when seen from a plan view, and at a position where a suitable electrical neutrality can be obtained. Here, the Hall sensor incorporated therein is positioned in accordance with the magnetic poles of the corresponding magnet; in this case, with a magnet comprising six magnetic poles, the Hall sensor is disposed at a position selected from any one of 90°, 150°, 210° or 270° from the center of the air-core armature coil.

The stator base 44 thus configured is attached to the bracket 111 using an anaerobic adhesive. At this time, the detent torque generation protrusions 111b are fitted in the long holes 44b. Accordingly, the detent torque generation protrusions 111b are completely contained within the stator base 44, and no consideration has to be given to their thickness. In other words, as described earlier, the detent torque generation protrusions 111b can be set at an optimal position without unreasonably forcing the detent torque generation member to be contained within the air core armature coils.

Because there is a through hole 111c at the position where the drive circuit member D is disposed, the stator base 44 can be partially dropped therein, allowing the drive circuit member D to assume a low profile.

In the present embodiment four long holes 44b and four detent torque generation protrusions 111b are provided.

Alternatively, in a case where a stator base has a thickness of, for example, 0.15 mm or more, the detent torque generation protrusions 111b can also have a height of 0.15 mm or more, further improving detent torque generation function. Therefore, using only one protrusion is also possible. On the other hand, to keep motor thickness to 2 mm or less, the stator base thickness must be kept around 0.1 mm as in the present embodiment. In such a constitution, at least two long holes 44b and two detent torque generation protrusions 111b are preferably provided.

Fifth Embodiment

Figure 8:
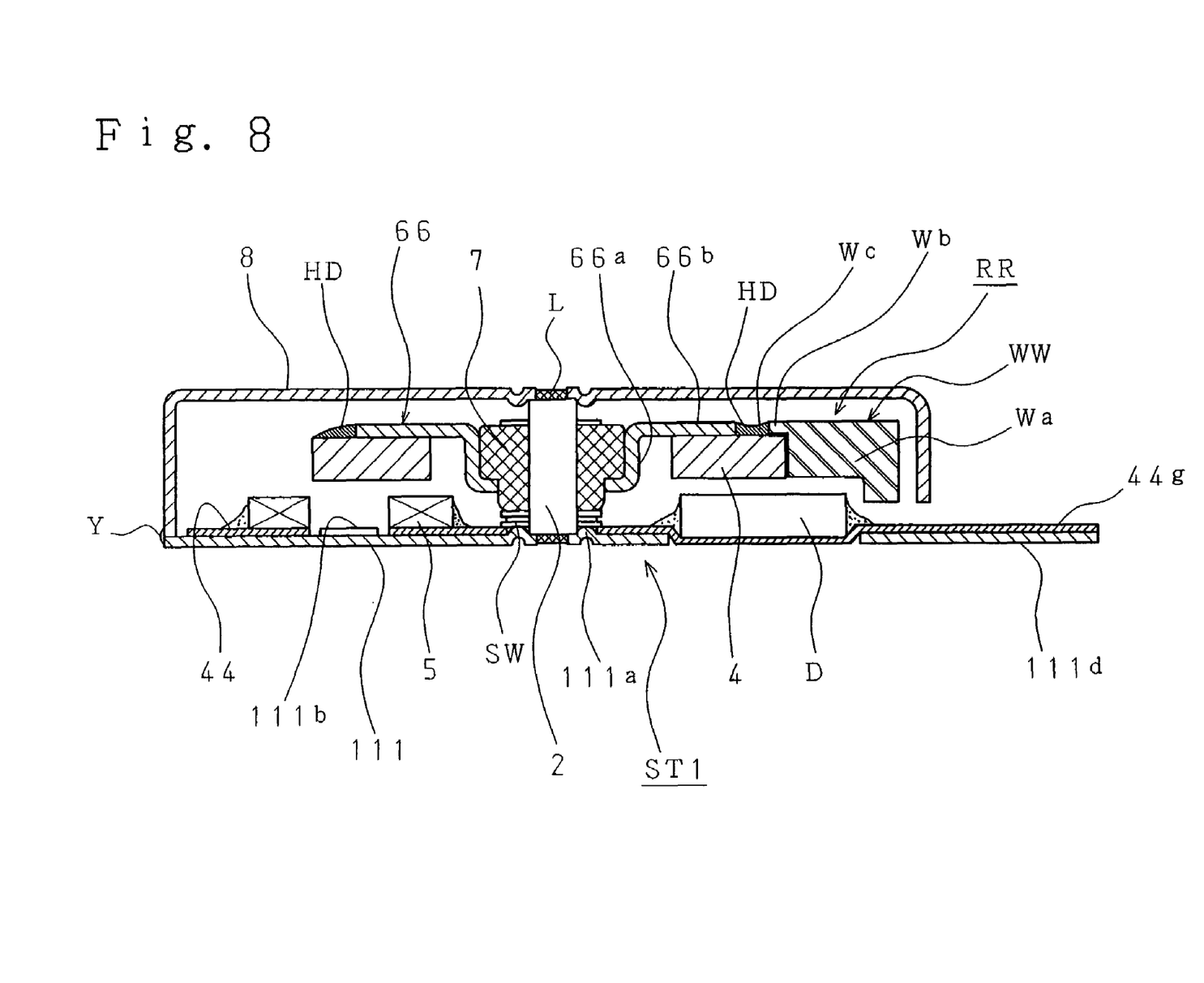
FIG. 8 is a vertical cross-sectional view of an axial air-gap brushless vibration motor equipped with the stator of FIG. 7.

FIG. 8 shows a shaft rotation type axial air-gap brushless vibration motor of a coreless style comprising such a stator ST1.

More specifically, an eccentric rotor RR facing the stator ST1 across an axial air gap comprises an axial air-gap magnet M having formed on the surface nickel plating or other coating film facilitating soldering, an arc-shaped eccentric weight WW disposed partly around the magnet M, a rotor case 66 with a thickness of about 0.15 mm to which the foregoing are attached, and the above described bearing 7 attached to a shaft supporting part 66a at the center of rotation of the rotor case 66. The eccentric rotor RR thus configured is rotatably attached to the shaft 2 via the thrust washer SW, accommodated in the outer case 8, and attached to an opening in the outer periphery of the bracket 111 by laser welding Y.

The rotor case 66 has a bearing support part 66a and a flat part 66b to which the top of the magnet M is attached. The flat part 66b is slightly smaller than the outer diameter of the magnet M.

The eccentric weight WW is configured to include an arc-shaped main component Wa and ceiling Wb, integral therewith, and that protrudes slightly inward of the main component Wa. A recess Wc is formed so that the magnet M is visible in the gap with the flat part 66b. The eccentric weight WW is fixed by lead free solder HD at the flat part 66b, a part of the magnet M, and ceiling Wb.

At the side opposite the eccentric weight WW, as well, the magnet M and rotor case 66 are similarly attached using solder HD.

The above soldering can be reflow soldering, and it is understood that the magnet M is magnetized after soldering.

Therefore, the foregoing members are securely attached by soldering, ensuring impact resistance.

The eccentric rotor RR thus configured is rotatably attached to the shaft 2, and covered with the outer case 8.

Here, for resistance against impact in the radial direction, the distal end of the shaft 2 is laser welded.

An opening part in the outer case 8 covering the eccentric rotor RR is assembled by laser spot-welding the outer periphery of the bracket 111 on the stator side.

The stator of the present invention is not limited to a vibration motor, and it can be adopted for use in an ordinary rotation type single phase brushless motor such as a typical fan motor, and the shaft can be fixed on the rotor side and the bearing disposed on the stator.

While the foregoing described a motor comprising a drive circuit member having a Hall sensor type single-phase armature coil, the Hall sensor does not have to be contained in the drive circuit member, and may be disposed separately. Further, application is possible to a sensorless motor requiring no detent torque generation member and comprising three three-phase air-core armature coils.

The present invention can be implemented in a variety of ways, without departing from this technical concept and features inherent thereto. Therefore, the above-described embodiments are merely illustrative examples and should not be construed as limiting. The technical scope of the present invention is described by the claims and is not restricted to the text of the description.

What is claimed is:

1. A stator, comprising:
   a bracket including a shaft bearing portion at a center thereof;
   a stator base including a flexible printed wiring board attached to the bracket outward of the shaft bearing portion, the stator base having a central through hole in which the shaft bearing portion is containable, the stator base further including at least one long hole provided radially outward of the central through hole;
   at least one magnetic detent torque part accommodated in the long hole so as not to protrude from the stator base upper surface;
   air-armature coils disposed on the stator base, the air-core armature coils being of a single-phase type; and
   a drive circuit member disposed on the stator base so as not to overlap with the air-core armature coils, said bracket having a recess at a section corresponding to a bottom of the drive circuit member, and the stator base being at least partly embedded in the recess in a thickness direction thereof.

2. A stator according to claim 1, further comprising a detent torque generation member disposed in the central through hole.

3. A stator according to claim 2, wherein:
   the bracket has nonmagnetic or weak magnetic properties; and
   the central through hole and the long hole in the stator base are formed so as to be connected to each other, and said at least one detent torque part accommodated in the long hole is formed integral with the detent torque generation member disposed in the central through hole.

4. A stator according to claim 1, wherein:
   the bracket is formed of a magnetic metal sheet; and
   the detent torque part is integral with, and protrudes from, the bracket.

5. A stator according to claim 4, further comprising magnetic attraction force buffer structure formed adjacent to the detent torque part of the bracket.

* * * * *